United States Patent
Cleland

[11] 3,975,978
[45] Aug. 24, 1976

[54] DIRECT COUPLED WAY SYSTEM FOR MOVABLE HEAD BAND SAW MACHINES

[75] Inventor: Charles E. Cleland, Edina, Minn.

[73] Assignee: Continental Machines, Inc., Savage, Minn.

[22] Filed: May 9, 1975

[21] Appl. No.: 576,394

[52] U.S. Cl. ................................. 83/796; 83/814
[51] Int. Cl.² ........................................ B23D 49/04
[58] Field of Search ............ 83/788, 794, 796, 811, 83/812, 814, 816

[56] References Cited
FOREIGN PATENTS OR APPLICATIONS
558,990   6/1958   Canada ................................. 83/812

Primary Examiner—Willie G. Abercrombie

[57] ABSTRACT

A direct coupled way system for band saw machines wherein a cutting band is trained in tension over spaced upstream and downstream band wheels which are supported by a movable head for moving the cutting band with respect to a work piece held in position in the path of the cutting band by an arrangement of support members. A shoe is slidably connected to the downstream support member, i.e. the support member which lies between the work piece and the downstream band wheel. A leg having a first end and a second end is connected at its first end to the downstream section of the movable head and at its second end engages the shoe, the resulting way system thereby directly couples the downstream section of the movable head and the downstream support member to obviate deflections in the movable head and other structural components which result in dimensional changes in the distance between the downstream section of the movable head and the downstream support member which are caused by fluctuations in the cutting force. The leg is connected to the downstream section of the movable head and moves with the movable head in relation to the work piece. The shoe, being slidably connected to the downstream support member and to the leg, is permitted to move in the direction of movable head motion as the cutting band is moved into or out of the work area. The shoe and leg may be integrally molded or otherwise rigidly connected in band saw machines where the movable head is constrained to 1° of motion relative to the work piece. The shoe and leg are slidably connected in band saw machines where the movable head is permitted more than one degree of motion relative to the work piece.

17 Claims, 15 Drawing Figures

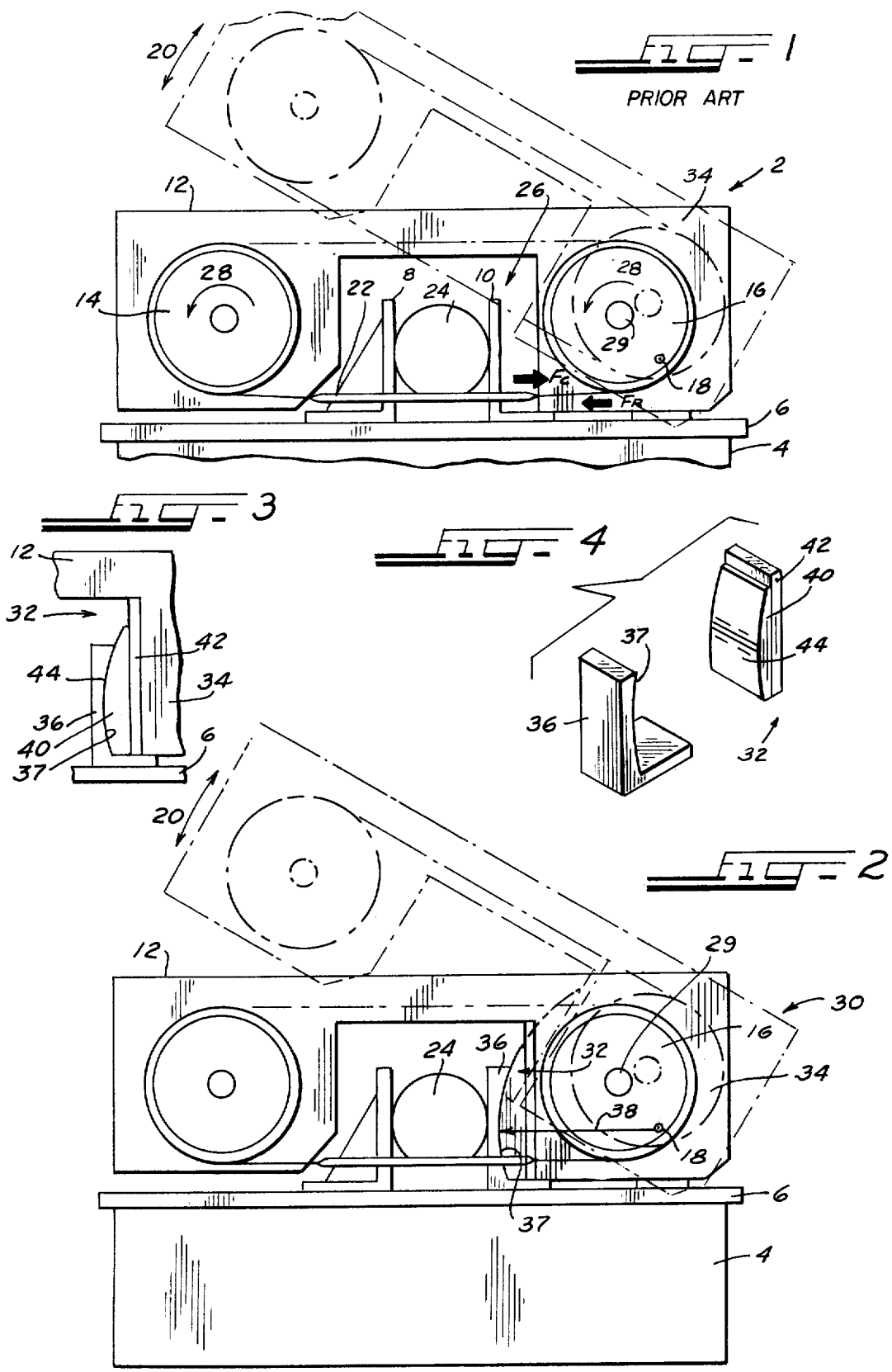

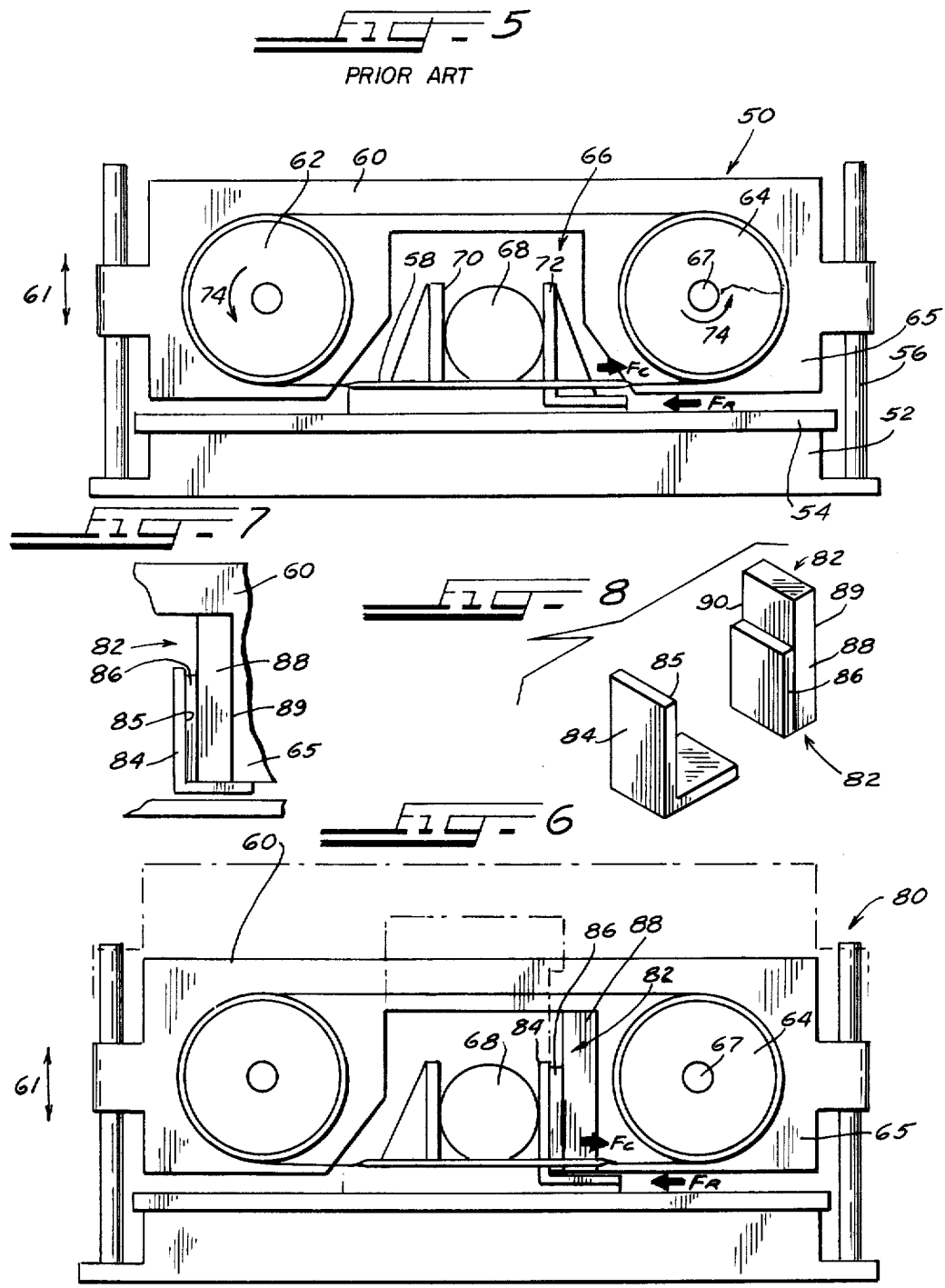

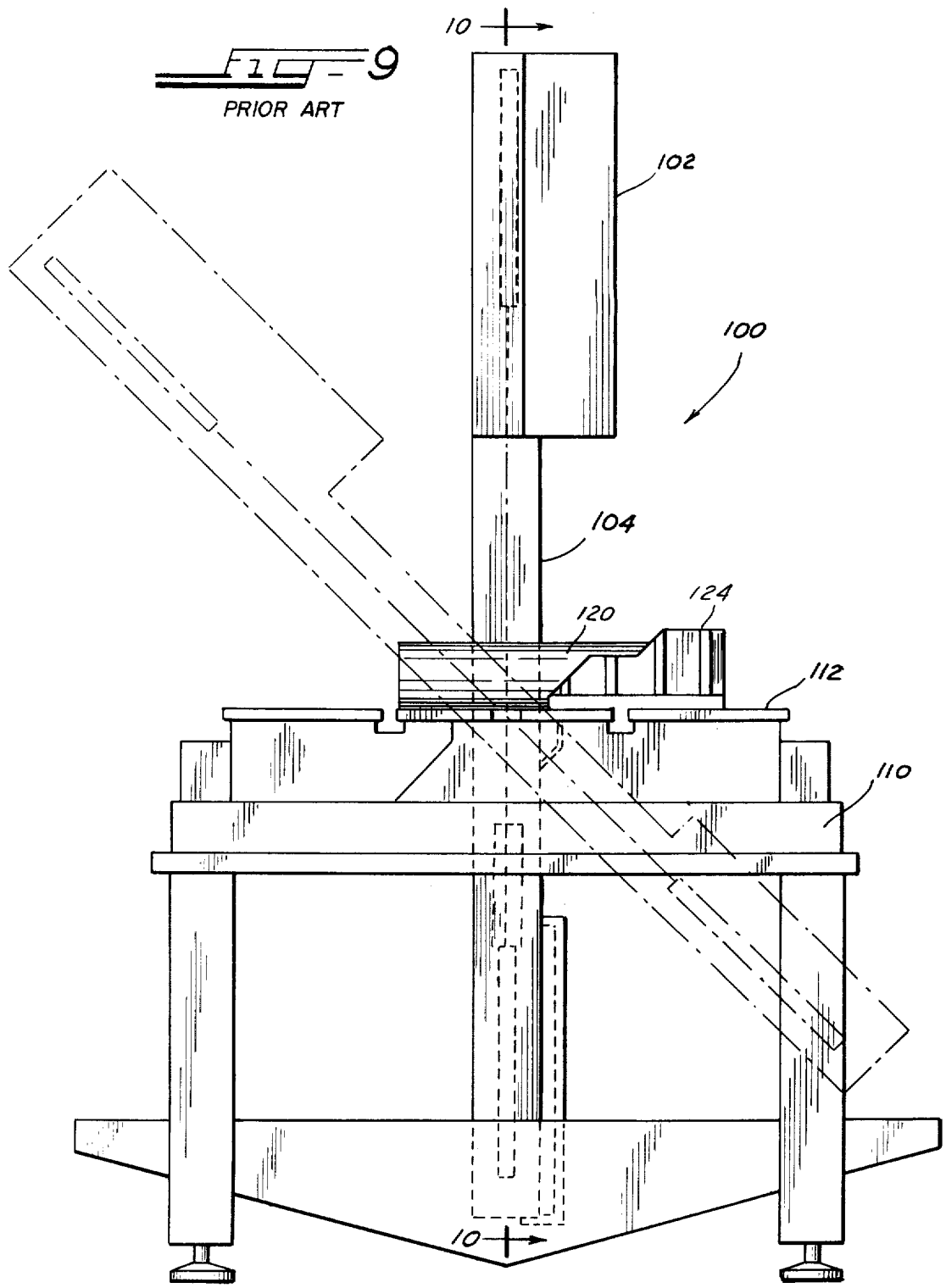

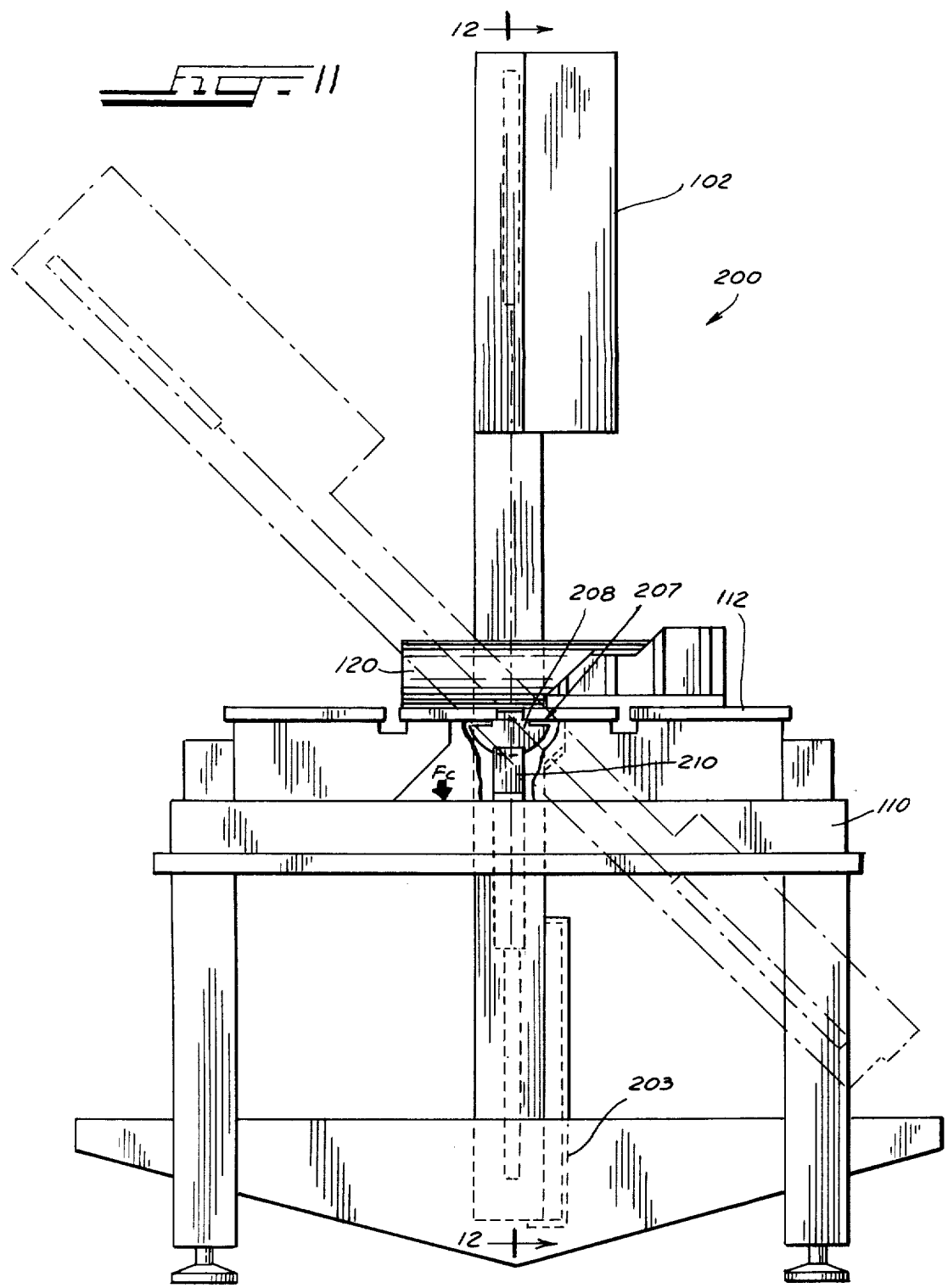

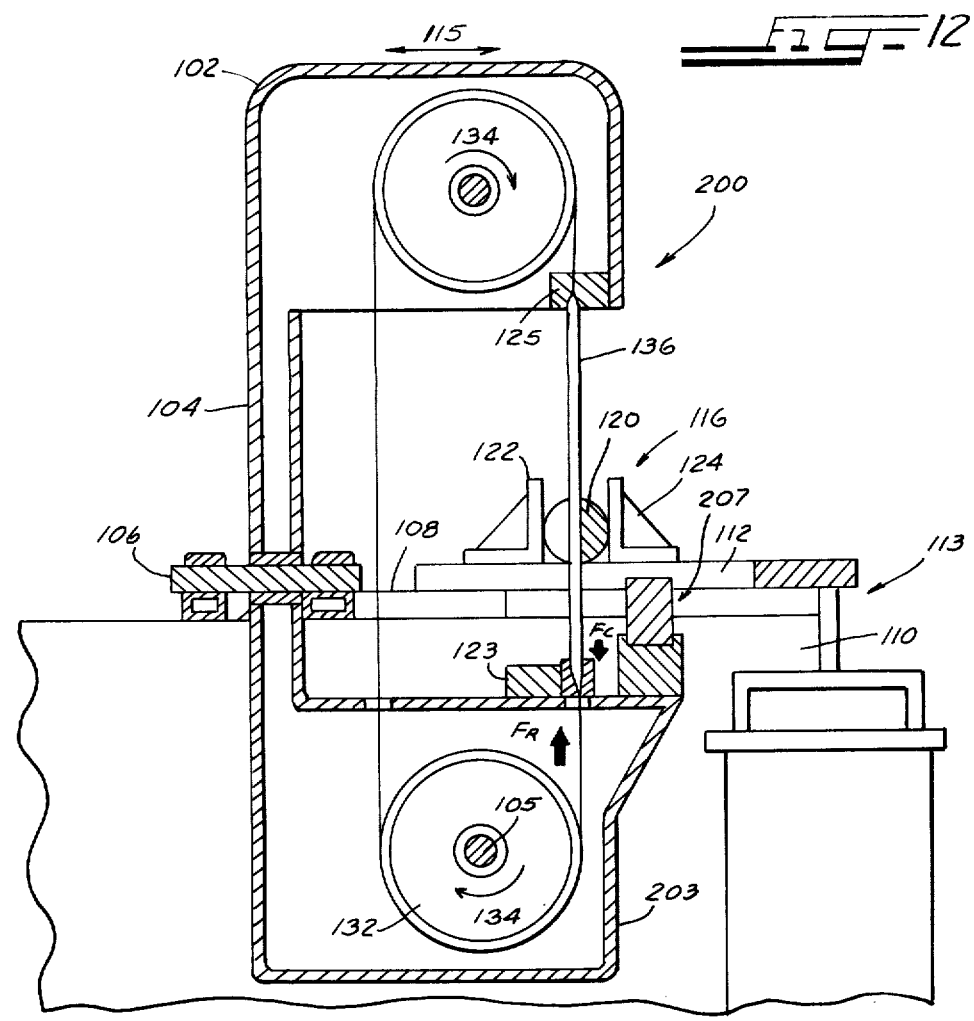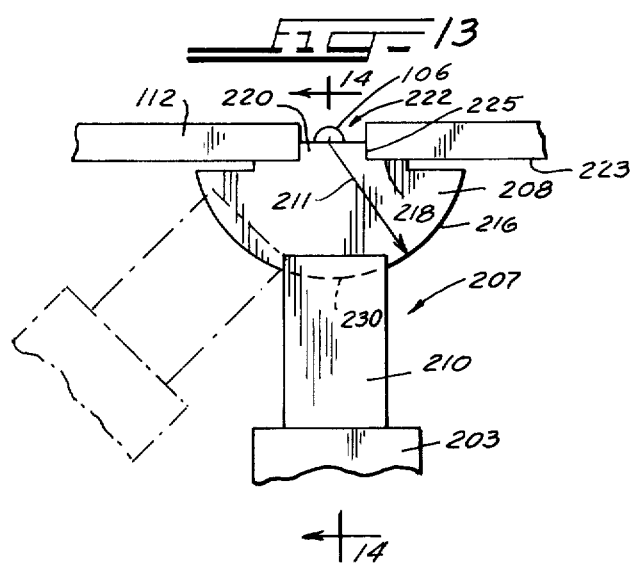

DIRECT COUPLED WAY SYSTEM FOR MOVABLE HEAD BAND SAW MACHINES

BACKGROUND OF THE INVENTION

1. Field of the Invention

The present invention relates to way systems for band sawing machines of the moving head variety and more particular to direct coupled way systems for obviating dimensional changes in the distance between the downstream support member and the downstream section of the movable head due to deflecting in the movable head and other structural components caused by fluctuations in the cutting force thereby avoiding unwanted vibrations.

2. Description of the Prior Art

Band saw machines of the movable head variety can be grouped into essentially three categories or types. The first, and perhaps the most common, type is that commonly referred to as the scissors type cutoff saw wherein the head portion of the band saw machine is pivotally raised and lowered relative to the work area in a scissors motion. During the downstroke the controlled pivotal or scissors closing movement of the cutting stretch of the cutting band cuts through the work piece. The second type moving head band saw machine, which may be referred to as a vertical feed band saw machine, employs one or two posts, usually oriented in the vertical direction, which guide the head of the band saw machine as it is vertically raised and lowered with respect to the work area. The head portion of the second type band saw machine customarily remains horizontal at all times during operation and cutting of the work piece occurs during the controlled downward movement of the head. The third general type of movable head band saw machine is commonly referred to as a tilt frame or tilt head band saw machine. In the tilt head band saw machine, the head portion of the saw generally carries or supports two band wheels and is mounted approximately mid-way between the wheels to a slidably mounted support member which may be referred to as a movable carriage. The movable carriage in turn, is supported on the band saw machine base through a carriage way system which permits a translatory motion of the carriage and movable head relative to the work area, such translatory motion usually being in the horizontal plane. In the tilt frame band saw machine, a work table or work surface is supported by the band saw machine base above or higher than the movable carriage and carriage way such that the movable carriage supporting the movable head is permitted to move toward and away from the front of the band saw machine with the cutting stretch of the cutting band being fed through the work area for cutting a work piece. The movable head of a band saw machine of this third type is customarily mounted to the movable carriage by means of a pivotal connection which permits the entire movable head to be tilted out of the vertical plane for purposes of making an angular cut through the work piece as the movable carriage supporting the movable head is slideably moved toward the front of the machine.

In movable head band saw machines of the first, second and third types, the cutting edge of the cutting band is customarily twisted by means of blade guides to face the work area and is pulled crosswise through the work piece by a linear force, commonly referred to as a cutting force, which is imparted to the cutting band by the downstream band wheel, i.e. the band wheel receiving the cutting band immediately after it has passed through the work piece, even through the band saw machine may be driven by the upstream band wheel. Due to inconsistencies in the teeth of the cutting band or band saw blade, variations and inconsistencies in the work piece material, and the chip production action of the cutting band teeth, the cutting force fluctuates substantially and quite rapidly during cutting operations. Of course, in a reactionary sense, the cutting band of the band saw machine imparts on the downstream band wheel a force which is equal and opposite to the cutting force. Thus, the rapid fluctuations in the cutting force give rise to rapid fluctuations in the equal and opposite force acting on the downstream band wheel and directed toward the work piece and, thus, tending to cause deflections in the frame of the movable head and other structural members. Such deflections result in dimensional changes in the distance between the downstream support member, i.e. the support member between the work piece and the downstream band wheel, and the downstream portion of the movable head thereby causing vibrations in the movable head and other band saw machine structural members connected to the movable head. Because of the indirect path which counteracting forces tending to avoid such deflections must take through a series of adjoining structural components between the work piece and the downstream band wheel, these deflections of the movable head and other band saw machine structural members continue to cause unwanted vibrations in the band saw machine during cutting operations. In the absence of such deflections, rapid fluctuations in the cutting force would be reflected as rapidly fluctuating tensile stresses in the cutting band and would be countered by increased drive power from the band saw machine drive wheel. Rapid fluctuations in the equal and opposite reaction force acting upward on the downstream wheel could be absorbed as tensile stresses or compressive forces by other structural components. However, no effective means has thus far been devised for avoiding such deflections in movable head type band saw machines.

Thus, it would be a desirable advance in the art to provide a way system for directly coupling the downstream support member and the downstream portion of the movable head in band saw machines to avoid deflections in the movable head and other structural component and dimensional changes in the distance between the downstream support member and the downstream portion of the movable head thereby avoiding unwanted vibrations resulting from rapid fluctuations in the cutting force. It would be a further advance in the art to provide a direct coupled way system for band saw machines which can be varied for use in connection with any one of the three general types of band saw machines to eliminate deflections in the movable head and other structural components caused by rapid fluctuations in the cutting force. It would be yet another desirable advance in the art to eliminate movable head and other structural component vibrations by providing a direct coupled way system comprising a shoe means and a leg means which may be integrally molded or otherwise rigidly connected in band saw machines wherein the movable head is constrained to one degree of motion relative to the work piece and may be slidably connected in band saw machines wherein the movable head is permitted more than one degree of motion relative to the work piece.

BRIEF DESCRIPTION OF THE INVENTION

A direct coupled way system for band saw machines of the type wherein a cutting band is trained in tension over spaced upstream and downstream band wheels which are supported by a movable head for moving the cutting band with respect to a work piece held in position in the path of the cutting band by an arrangement of support members. The direct coupled way system comprises a shoe which is slidably connected to the downstream work piece support member, i.e., the support member which lies between the work piece and the downstream band wheel, and further comprises a leg which is interposed between the downstream section of the movable head and the shoe, such that the resulting way system directly couples the downstream section of the movable head and the downstream support member to prevent dimensional changes in the distance between the downstream portion of the movable head and the downstream support member caused by deflections in the movable head and other structural components with fluctuations in the cutting force.

In scissors type movable head band saw machines, the shoe comprises a substantially rectangular block with an arcuate surface for slidably engaging a matching arcuate surface of the downstream support member. The radius of curvature of the shoe arcuate surface is equal to the distance between the arcuate surface of the downstream support member and the pivot axle of the movable head. In scissors type band saw machines, the movable head of which is customarily constrained to one degree of motion relative to the work piece, the leg comprises a substantially rectangular block which may be integral with or otherwise rigidly connected to the shoe opposite the shoe arcuate surface. In scissors type movable head band saw machines, the leg is interposed between the shoe and the downstream section of the movable head such that the resultant way system directly couples the downstream section of the movable head and the downstream support member thereby preventing dimensional changes in the distance between the downstream section of the movable head and the downstream support member caused by deflections of the movable head and other structural components with fluctuations in the cutting force.

In the second type, vertical feed, movable head band saw machines, characterized by a movable head constrained to move along one or two posts or head guides customarily in the vertical direction, the direct coupled way system shoe comprises a substantially rectangular block which is slidably connected to the downstream support member. The direct coupled way system leg comprises a substantially rectangular block which is interposed between the shoe and downstream portion of the movable head such that the resulting way system directly couples the downstream support member and the downstream position of the movable head to prevent the movable head and other structural components from deflecting with variations in the cutting force. For the second type band saw machine, the shoe and the leg may be integrally molded or otherwise rigidly connected since the movable head is constrained to one degree of motion relative to the work piece.

In the third type movable head band saw machines, the tilt head type band saw machines in which the movable head is pivotally mounted on a movable carriage and, thus, permitted 2° of motion relative to the work piece, the shoe preferably comprises a cylindrical section of material having an arcuate face and a cord face, the cord face having a rectangular projection extending outward from its center. The leg comprises a rectangular body portion having at one end a slot bounded by vertical walls separated by a distance equal to the height of the cylindrical section of material making up the shoe, i.e., the distance between the front and rear faces of the shoe, and an arcuate race for slidably engaging the arcuate face of the shoe. The radius of curvature of the arcuate face of the shoe and the arcuate race of the leg is equal to the distance between the movable head pivotal mounting and the arcuate face of the shoe. The rectangular projection extending outward from the center of the cord face of the shoe is preferably of a width slightly less than the width of a passageway machined in the work table of the band saw machine to permit passage of the cutting band through the work area. The rectangular projection acts to guide the shoe along the work table passageway as the movable head is moved toward and away from the front of the band saw machine.

Movable carriage movement, of course, is guided by the carriage way system. The leg is connected to the downstream portion of the movable head such that the arcuate race of the slot slidably engages the arcuate face of the shoe and the vertical walls of the slot slidably engage the front and rear faces of the shoe. The slidable engagement of the shoe and leg slot arrangement permits the leg to tilt with the movable head while the shoe remains stationary with its rectangular projection positioned within the work table passageway. The leg is rigidly connected to the downstream portion of the movable head and the vertical walls of the slot engage the front and rear faces of the shoe and force the shoe to move along the work table passageway toward and away from the front of the band saw machine as the cutting band is advanced into and withdrawn from the work area. Thus, irrespective of the position or tilt angle of the movable head, the shoe and leg arrangement directly couple the downstream portion of the movable head and the downstream support member thereby providing a direct path for counteracting forces and, thus, preventing deflections of the movable head and other structural components with variations in the cutting force.

The shoe and leg may be integrally molded or otherwise rigidly connected in the third type band saw machines in which the movable head is not pivotally mounted on the movable carriage in which case the shoe and leg may be substantially rectangular blocks, there being no need for the shoe arcuate face and leg slot arrangement. However, the rectangular projection extending outward from the shoe is preferably maintained as a simple means for guiding the shoe within the work table passageway as the movable head is moved toward and away from the front of the band saw machine.

It is thus a primary object of the present invention to provide a way system for directly coupling the downstream support member and the downstream section of the movable head in movable head type band saw machines to avoid dimensional changes in the distance between the downstream support member and the downstream section of the movable head caused by deflections in the movable head and other structural components with fluctuations in the cutting force.

It is a further object of the present invention to provide a direct coupled way system for absorbing as compressive forces fluctuations in the cutting force thereby eliminating deflections in the movable head and other structural components with fluctuations in the cutting force.

It is another object of the present invention to provide a way system comprising a shoe and a leg which may be slidably engaged to permit tilting of the leg with the movable head in tilt head type band saw machines while maintaining a direct coupling between the downstream support member and the downstream portion of the movable head.

These and other objects, advantages and features of the present invention will be apparent from the following description of the invention, exemplary and preferred embodiments of which are illustrated in the appended drawings.

DESCRIPTION OF THE DRAWINGS

FIG. 1 is a schematic profile view of a conventional scissors type movable head band saw machine.

FIG. 2 is a schematic profile view of the scissors type band saw machine of FIG. 1 with a direct coupled way system in accordance with the present invention.

FIG. 3 is an enlarged fragmentary view of the direct coupled way system and downstream support member of the scissors type band saw machine shown in FIG. 2.

FIG. 4 is an assembly view of the direct coupled way system and downstream support member of FIG. 3.

FIG. 5 is a schematic profile view of a conventional vertical feed movable head band saw machine.

FIG. 6 is a schematic profile view of the movable head band saw machine of FIG. 5 with a direct coupled by system in accordance with the present invention.

FIG. 7 is an enlarged fragmentary view of the direct coupled way system, downsteam support member and surrounding structural components of the movable head band saw machine of FIG. 6.

FIG. 8 is an assembly view of the direct coupled way system and downstream support member shown in FIG. 7.

FIG. 9 is a schematic profile view of a conventional movable head tilt frame band saw machine.

FIG. 11 is a schematic profile view of the movable head tilt frame band saw machine of FIG. 9 with a direct coupled way system in accordance with the present invention.

FIG. 12 is a schematic cross section view of a conventional movable head tilt frame band saw machine similar to that shown in FIG. 10 with a direct coupled way system in accordance with the present invention.

FIG. 13 is an enlarged fragmentary view of the direct coupled way system of the movable head tilt frame band saw machine of FIG. 11.

FIG. 14 is a cross sectional view of the direct coupled way system of FIG. 13 taken along line 14—14.

DETAILED DESCRIPTION OF THE PREFERRED EMBODIMENTS

Figure 10:
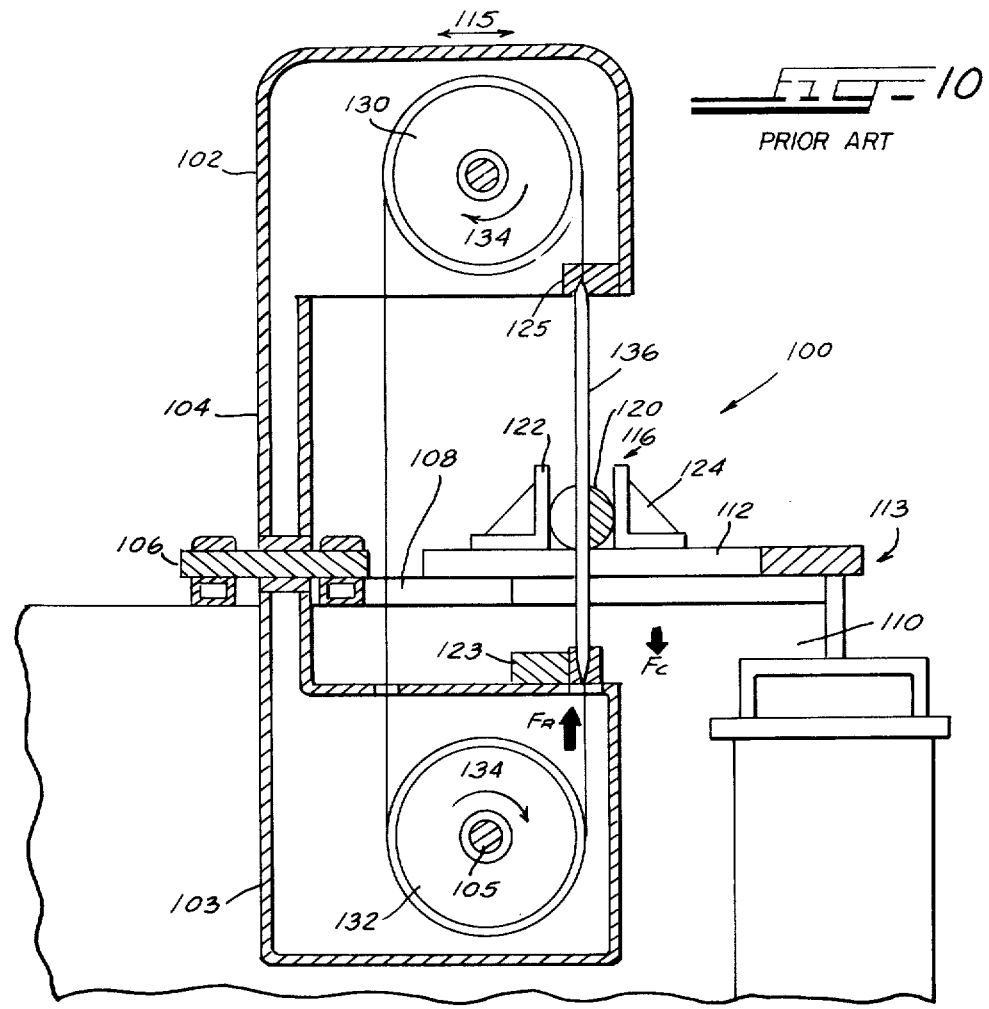
FIG. 10 is a schematic cross section view of a conventional movable head tilt frame band saw machine taken along line 10—10 of FIG. 9.

With reference generally to FIGS. 1 through 14, the three conventional types of movable head band saw machines are the scissors type movable head band saw machine, the vertical feed movable head type band saw machine, and the movable head tilt frame type band saw machine, schematic views of which are shown respectively in FIGS. 1, 5, and 9.

With reference to FIG. 1, scissors type movable head band saw machine 2, comprises base 4, work table 6 and upstream and downstream support members 8 and 10 respectively, and further comprises movable head 12 housing upstream and downstream band wheels 14 and 16 respectively. Movable head 12 is pivotally connected to base 4 by means of pivot axle 18 such that movable head 12 is permitted to move pivotally in the direction indicated by arrow 20 thereby moving cutting band 22 which is trained in tension around spaced upstream and downstream band wheels 14 and 16 respectively into and out of the work area 26. Cutting band 22 is twisted in a conventional manner by means of band guides (not shown for clarity) so that its cutting teeth are directed toward work area 26 and the cutting band 22 lies in the plane of movable head 12 motion. Work piece 24 supported by work table 6 and held firmly in place in work area 26 by upstream and downstream support members 8 and 10 respectively, is cut by cutting band 22 during the scissors closing motion of movable head 12. Upstream and downstream band wheels 14 and 16 respectively are caused to rotate in the direction indicated by arrows 28 and a cutting force (indicated by vector $F_C$), sufficient to draw cutting band 22 through work piece 24 is imparted upon cutting band 22 by downstream band wheel 16 which may or may not be power driven. Cutting force $F_C$ required to cut work piece 24 varies in magnitude during the cutting operation due to inconsistencies in the band saw or cutting band teeth, inconsistencies in the work piece material and the chip production action of the band saw teeth. The reaction force (indicated by vector $F_R$) experienced by downstream band wheel 16 is equal and opposite to cutting force $F_C$ and, as a result of fluctuations in the cutting force $F_C$ during cutting operations, the reaction force $F_R$ experienced by downstream band wheel 16 similarly fluctuates. The reaction force $F_R$ experienced by downstream band wheel 16 is directed upstream toward work piece 24, as shown, and tends to deflect movable head 12 and other structural components conventionally linking downstream band wheel 16 and downstream support member 10 such that the distance between downstream band wheel 16 and downstream support member 10 fluctuates with fluctuations in the cutting force $F_C$. The structural components linking downstream band wheel 16 and downstream support member 10 cannot effectively counteract the fluctuations in cutting force $F_C$ because of the indirect and complex path through which reaction forces must act. In particular, counteracting forces originate at downstream support member 10 and work piece 24 and are thereafter translated to work table 6 and base 4, through pivot axle 18 to movable head 12 and finally to downstream band wheel 16 through shaft-bearing 29. Because of the circuitous path which such counteracting forces must follow, fluctuations in cutting force $F_C$ cause deflections in movable head 12, pivot axle 18, work table 6, base 4, and downstream support member 8. Such deflections cumulatively give rise to dimensional changes in the distance between downstream support member 10 and downstream band wheel 16 causing unwanted vibration of interconnecting structural members.

With reference to FIG. 2, scissors type movable head band saw machine 30 is similar to conventional scissors type movable head band saw machine 2 (FIG. 1) except that direct coupled way system 32 is interposed between downstream portion 34 of movable head 12 and downstream support member 36. Downstream support member 36 differs from downstream support member 10 (FIG. 1) in that downstream surface 37 of downstream support member 36 has an arcuate curvature with a radius, indicated by arrow 38, equal to the distance between pivot axle 18 and downstream surface 37 of downstream support member 36. With direct coupled way system 32 engaging downstream support member 36 as shown, fluctuations in the reaction force $F_R$ experienced by downstream band wheel 16 due to fluctuations in cutting force $F_C$ are counteracted by counteracting forces which tend to maintain downstream band wheel 16 in its spaced position relative to downstream support member 10. Counteracting forces are transmitted directly to downstream band wheel 16 through bearing-axle 29 from downstream support member 36 and work piece 24 directly through direct coupled way system 32 and downstream section 34 of movable head 12. Thus, direct coupled way system 32 provides a direct path for counteracting forces between downstream support member 36 and downstream band wheel 16 thereby avoiding deflections customarily experienced in structural members when counteracting forces are provided only a complicated circuitous path.

With reference to FIGS. 3 and 4, direct coupled way system 32 comprises shoe 40 and leg 42. Shoe 40 comprises a substantially rectangular block with an arcuate face 44 having a radius of curvature substantially matching that of arcuate surface 37 of downstream support member 36, i.e., equal to the distance between pivot axle 18 and downstream surface 37 of downstream support member 36. Leg 42 comprises a substantially rectangular block which may be integral with or otherwise rigidly connected to shoe 40. Shoe 40 slidably engages downstream support member 36 such that arcuate face 44 of shoe 40 and arcuate surface 37 of downstream support member 36 are permitted to slide with respect to one another as movable head 12 is pivoted about pivot axle 18 in its scissors motion. Leg 42 is preferably rigidly connected to downstream section 34 of movable head 12 and pivots about pivot axle 18 with movable head 12.

Referring to FIG. 5, vertical feed movable head band saw machine 50 comprises base 52 and work table 54 and further comprises movable head 60 supporting upstream and downstream band wheels 62 and 64 respectively. Movable head 60 is constrained to move in the direction indicated by arrow 61 along head guides 56 such that cutting band 58 may be moved into and out of work area 66 to effect cuts on a work piece 68 which is supported by work table 54 and held in the path of cutting band 58 by upstream and downstream support members 70 and 72 respectively. Cutting band 58 is twisted in the conventional manner so that the cutting stretch lies in the plane of motion of movable head 60.

With further reference to FIG. 5, during cutting operations upstream and downstream band wheels 62 and 64 respectively are caused to rotate in the direction indicated by arrow 74 thereby drawing cutting band 58 through work piece 68 to effect a cut on work piece 68 as movable head 60 is moved downward in the direction of arrow 61 along head guides 56. In a manner somewhat similar to that discussed with respect to the scissors type movable head band saw machine 2 (FIG. 1), downstream band wheel 64 imparts upon cutting band 58 a cutting force indicated by force vector $F_C$. Downstream band wheel 64, like downstream band wheel 16 (FIG. 1), experiences a reaction force $F_R$ equal and opposite to cutting force $F_C$. For the reasons discussed with reference to FIG. 1, cutting force $F_C$ fluctuates rapidly during cutting operations giving rise to rapid fluctuations in the reaction force $F_R$ experienced in downstream band wheel 64. The rapidly fluctuating reaction force $F_R$ experienced by downstream band wheel 64 tends to urge downstream portion 65 of movable head 60 toward downstream support 72. Counteracting forces tending to hold downstream band wheel 64 in its spaced position relative to downstream support member 72 conventionally originate in downstream support member 72 and are thereafter transmitted through work table 54, base 52, head guides 56 and finally to downstream band wheel 64 through downstream portion 65 of movable head 60 and bearing shaft 67. Because of the circuitous path counteracting forces are required to follow, the rapidly fluctuating reaction force $F_R$ experienced by downstream band wheel 64 is not effectively counteracted and consequently, stuctural members in the path described above for counteracting forces are deflected resulting in dimensional changes in the distance between downstream band wheel 64 and downstream support member 72.

With reference to FIG. 6, vertical feed movable head band saw machine 80 is similar to that shown in FIG. 5 except that direct coupled way system 82 is interposed between downstream support member 84 and downstream portion 65 of movable head 60. With further reference to FIG. 6, counteracting forces tending to hold downstream band wheel 64 in its spaced position relative to downstream support member 84 originate with downstream support member 84 and are transmitted directly through direct couple way system 82 to downstream band wheel 64 through downstream portion 65 of movable head 60 and directly to downstream band wheel 64 through bearing-shaft 67. Thus, deflections which would otherwise result in vibrations in structural components conventionally linking downstream band wheel 64 and downstream support member 84 are eliminated.

With reference to FIGS. 7 and 8, direct coupled way system 82 comprises shoe 86 and leg 88. Shoe 86 comprises a substantially rectangular block which slidably engages the face 85 of downstream support member 84. Leg 88 is preferably rigidly connected at a first edge 89 to downstream portion 65 of movable head 60 and may be integral with or otherwise directly connected, as shown, to shoe 86 at a second edge 90. The sliding engagement between shoe 86 and face 85 of downstream support member 84 and the rigid connection between shoe 86 and leg 88 allows direct coupled way system 82 to move in the direction indicated by arrow 61 (FIG. 6) with movable head 60 such that at all times direct coupled way system 82 is interposed between downstream support member 84 and downstream portion 65 of movable head 60 thereby providing a path for counteracting forces tending to maintain downstream band wheel 64 in its spaced position relative to downstream support member 84.

With reference to FIGS. 9 and 10, conventional tilt frame movable head band saw machine 100 comprises movable head 102 which is pivotally connected through frame 104 and pivot axle 106 to movable carriage 108 which is slidably supported through way bars (not shown) by base 110 beneath work table 112 such that movable head 102 and movable carriage 108 are permitted to move toward and away from machine front 113 of tilt frame movable head band saw machine 100 in the direction indicated by arrow 115.

With reference to FIG. 10, movable head 102 supports upsream and downstream band wheels 130 and 132 respectively about which cutting band 136 is trained in tension. Cutting band 136 is twisted in the conventional manner by the action of upstream and downstream cutting band guides 125 and 123 respectively so that the cutting edge of cutting band 136 is directed toward work piece 120. Upstream and downstream band wheels 130 and 132 respectively are caused to rotate in the direction indicated by arrows 134 and, to effect a cut, cutting band 136 is drawn through work piece 120 which is supported in the work area 116 by work table 112 between support members 122 and 124 as movable head 102 is advanced toward machine front 113 in the direction indicated by arrow 115. By means of the pivot axle 106 connection between movable carriage 108 and head frame 104, movable head 102 is permitted to tilt out of the vertical place (see FIG. 9) about pivot axle 106 such that as movable head 102 is moved toward the machine front 113 of the tilt frame movable head band saw machine 100, an angular cut is made through the work piece 102.

During cutting operations, a cutting force indicated by force vector $F_C$ is imparted on cutting band 136 by downstream band wheel 132 in a manner similar to that described with reference to FIG. 1 and downstream band-wheel 132 experiences a reaction force indicated by vector $R_R$ equal and opposite to cutting force $F_C$. For the reasons described in discussion relating to FIG. 1, cutting force $F_C$ fluctuates rapidly during the cutting operation giving rise to rapid fluctuations in the equal and opposite reaction force $F_R$ experienced by downstream band wheel 132. The reaction force $F_R$ experienced by downstream band wheel 132 tends to urge downstream portion 103 of movable head 102 toward work table 112. Counteracting forces tending to maintain downstream band wheel 132 in its spaced position relative to work table 112 conventionally originate in work table 112 and work piece 120 and are transmitted along a path defined by work table 112, movable carriage 108, pivot axle 106, and head frame 104 eventually to reach downstream band wheel 132 through downstream portion 103 of movable head 102 and bearing-shaft 105. Because of the circuitous path provided for counteracting forces, the rapidly fluctuating reaction force $F_R$ experienced by downstream band wheel 132 results in deflections in movable head 102 and other structural components in the conventional path provided for counteracting forces. These deflections give rise to dimensional changes in the distance between downstream band wheel 132 and work table 112 causing unwanted vibrations.

With reference to FIGS. 11 and 12, tilt frame movable head band saw machine 200 is similar to that of FIG. 10 except that direct coupled way system 207 is interposed between the downstream portion 203 of movable head 102 and work table 112. Direct coupled way system 27 hereinafter described in more detail, preferrably comprises a plurality of way surfaces. With direct coupled way system 207 directly connecting the downstream portion 203 of movable head 102 and work table 112, counteracting forces tending to maintain downstream bandwheel 132 in its spaced position relative to work table 112 are transmitted from work table 112 directly through direct coupled way system 207 and thereafter to downstream band wheel 132 through downstream portion 203 of movable head 102 and bearing-shaft 105. Thus, with the direct path afforded by direct coupled way system 207, deflections in movable head 102 and other structural components in the conventional path of counteracting forces are eliminated along with unwanted vibrations.

Figure 15:
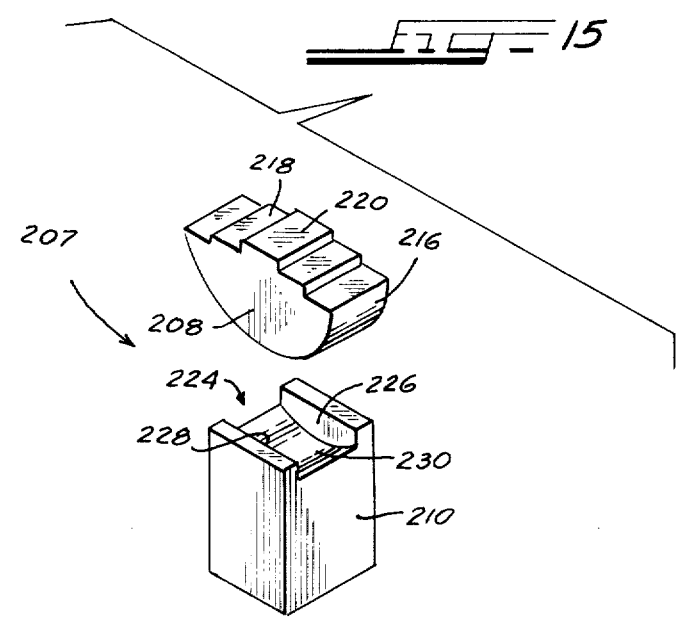
FIG. 15 is an exploded upper right perspective view of primary components of the way system shown in FIGS. 13 and 14.

With reference to FIGS. 13, 14 and 15, direct coupled way system 207 generally comprises shoe 208 and leg 210. Shoe 208 preferably comprises a cylindrical section of material having front and rear faces respectively 214 and 212, and further having an arcuate face 216 and a cord face 218. A rectangular extension 220 extends outward from the center of cord face 218 and is preferably of a width substantially equal to that of passageway 222 of work table 112 through which cutting band 136 passes as movable toward machine front 113 in the cutting operation. Leg 210 comprises a substantially rectangular block of material having a slot 224 of width equal to the distance between front and rear faces 214 and 212 respectively of shoe 208. Slot 224 is bounded on its sides by walls 226 and 228 and at its bottom by an arcuate race 230. The radius of curvature of both arcuate face 216 and arcuate race 230, indicated by arrow 211, in preferrably equal to the distance from the center of pivot axle 106 and arcuate face 216.

Referring to FIGS. 13 and 14, installed in tilt frame movable head band saw machine 200, direct coupled way system 207 is interposed between work table 112 and downstream portion 203 of movable head 102 such that rectangular extension 220 of shoe 208 slidably engages the walls 225 of passageway 222 of work table 112 and cord face 218 slidably engages the lower surface of work table 112. Leg 210 is rigidly connected to downstream portion 203 of movable head 102 and, through arcuate race 230, slidably engages arcuate face 216 of shoe 208, the latter slidable engagement permitting leg 210 to tilt (see FIG. 13) with downstream portion 203 of movable head 102 about pivot axle 106 while maintaining a direct coupling engagement between downstream portion 203 of movable head 102 and work table 112. Referring to FIG. 14, walls 226 and 228 of leg 210 engage respectively front and rear faces 214 and 212 of shoe 208 such that as movable head 102 is moved toward and away from machine front 113 in the direction indicated by arrow 115, shoe 208 is caused to slide along work table 112 constrained by the slidable engagement between rectangular projection 220 and walls 225 of passageway 222. Thus, direct coupled way system 207 comprises a plurality of way surfaces and irrespective of the position or tilt angle of movable head 102, downstream portion 203 of movable head 102 is directly coupled through direct coupled way system 207 to work table 112 thereby providing at all times a direct path for counteracting forces tending to maintain downstream band wheel 132 in its spaced position relative to work table 112. In particular, counteracting forces originating in work piece 120 and work table 112 are transmitted through downstream portion 203 of movable frame 102 and shaft-axle 105 to downstream band wheel 132 along a direct path comprising work table 112, cord face 218 of shoe 208, shoe 208 and then through slidably connected arcuate face 216 and arcuate race 230 to leg 210.

It will be understood that for movable head band saw machines generally of the type illustrated in FIGS. 9, 10, 11 and 12 wherein the movable head is not connected to the movable carriage by means of a pivot axle, i.e., the movable head is not adapted to tilt out of the vertical plane, the shoe and leg of the direct coupled way system may be integrally molded or otherwise rigidly connected. In particular, where movable head 102 is constrained to one degree of motion relative to the work piece 120, the need for arcuate face 216 of shoe 208 and the need for slot 224 of leg 210 are obviated since leg 210 need not slide or move relative to shoe 208.

With reference generally to FIGS. 2, 6, and 11, the present invention comprises a direct coupled way system for movable head type band saw machines which have a cutting band trained in tension over spaced upstream and downstream band wheels which are supported by a movable head. The direct coupled way system of the present invention comprises a shoe means and a leg means for directly coupling the downstream portion of the movable head and downstream support member, i.e., the support member (work piece holding clamps or work table) which lies between the work piece and the downstream band wheel to prevent dimensional changes in the distance between the downstream support member and the downstream portion of the movable head thereby eliminating deflections and vibrations in the movable head and other structural components of the movable head type band saw machine. Compressive counteracting forces tending to maintain the downstream band wheel in its spaced position relative to the work piece are transmitted along a direct substantially linear path from the downstream support member directly through the direct coupled way system of the present invention to the downstream band wheel through the downstream portion of movable head and the bearing-shaft of the downstream band wheel. For movable head band saw machines in which the movable head is constrained to 1° of motion relative to the work piece, the shoe means and the leg means may be integrally molded or otherwise rigidly connected. In movable head band saw machines wherein the movable head is permitted more than one degree of motion relative to the work piece, the shoe means and the leg means are slidably connected. Thus, the direct coupled way system of the present invention does not restrict or interfere with the motion of the movable head.

It should be expressly understood that various modifications, variations, and changes in the structure of the embodiments illustrated herein may be made without departing from the scope and spirit of the present invention as defined and claimed in the appended claims.

I claim:

1. A direct coupled way system for movable head type band saw machines wherein a cutting band is trained in tension over spaced upstream and dowstream band wheels which are supported by a movable head for moving the cutting band relative to a work piece held in position in the path of the cutting band by an arrangement of support members, the direct coupled way system comprising:

shoe means connected to the work piece support member lying between the work piece and the dowstream band wheel;

leg means connected between said shoe means and said dowstream band wheel such that during cutting operations, the spaced position of said downstrean band wheel relative to the work piece support member lying between the work piece and the downstream band wheel is maintained.

2. A direct coupled way system for movable head band saw machines as claimed in claim 1 wherein said shoe means is slidably connected to the work piece support member lying between the work piece and the dowstream band wheel.

3. A direct coupled way system for movable head band saw machines as claimed in claim 1 wherein said leg means is rigidly connected between said movable head and said shoe means.

4. A direct coupled way system for movable head band saw machines as claimed in claim 1 wherein said shoe means and said leg means are slidably connected to one another to permit motion of said leg means relative to said shoe means.

5. A direct coupled way system for movable head band saw machines wherein a cutting band is trained in tension over spaced upstream and downstream band wheels supported by a movable head for moving the cutting band with respect to work piece held in position in the path of the cutting band by an arrangement of support members, the direct coupled way system comprising:

shoe means slidably connected to the work piece support member lyiing between the work piece and the dowstream band wheel;

leg means having a first edge and a second edge, said second edge of said leg means rigidly connected to said movable head and said first edge of said leg means connected to said shoe means such that during band saw machine cutting operations, dimensional changes in the distance between said movable head and said support member lying between the work piece and the dowstream band wheel are obviated.

6. A direct coupled way system for movable head band saw machines as claimed in claim 5 wherein the work piece support member lying between the workpiece and the downstream band wheel comprises the work table.

7. A direct coupled way system for movable head band saw machines as claimed in claim 5 wherein the work piece support member lying between the work piece and the downstream band wheel comprises a work piece clamp.

8. A direct coupled way system for movable head band saw machines as claimed in claim 5 wherein said shoe means and said leg means are slidably connected to permit movement of said leg means relative to said shoe means.

9. A directed coupled way system for scissors type movable head band saw machines wherein the cutting band is trained in tension over spaced upstream and dowstream band wheels supported by a movable head which is pivotally connected to the machine base such that the movable head is permitted one degree of motion relative to a work piece held in position in the path of the cutting band by an arrangement of support members, the direct coupled way system comprising:

shoe mens having a substantially rectangular body portion with a first arcuate face and a second planer face, said arcuate face slidably for engaging the work piece support member lying between the work piece and the dowstream band wheel;

leg means having a substantially rectangular body portion with a first edge and a second edge, said first edge for engaging said second planer face of said shoe means and said second edge for engaging said movable head such that forces tending to maintain said downstream band wheel in its spaced position relative to the work piece support member lying between the workpiece and the downstream band wheel are transmitted through said shoe means, said leg means and said movable head to the downstream band wheel thereby avoiding deflections and vibrations in the movable head and other structural components between the workpiece and the downstream band wheel.

10. A direct coupled way system for scissors type movable head band saw machines as claimed in claim 9 wherein said shoe means and said leg means are rigidly connected to one another.

11. A direct coupled way system for vertical feed type movable head band saw machines wherein a cutting band is trained in tension over spaced upstream and downstream band wheels supported by a movable head which is constrained to move substantially in a vertical direction along at least one head guide with respect to a work piece held in position in the path of the cutting band by an arrangement of support members, the direct coupled way system comprising:

shoe means having a substantially rectangular body portion with a first planar face and a second planar face, said first planar face for slidably engaging the work piece support member lying between the work piece and the downstream band wheel.

leg means having a substantially rectangular body portion with a first edge and a second edge, said first edge for engaging said second planar face of said shoe means and said second edge for rigidly engaging said movable head thereby directly coupling said movable head and the support member lying between the work piece and the downstream band wheel through said shoe means and said leg means such that forces tending to maintain said down stream band wheel in its spaced position relative to the support member lying between the work piece and the downstream band wheel are transmitted from said work piece directly through said shoe means, said leg means, and said movable head to said downstream band wheel.

12. A direct coupled way system for vertical feed type movable head band saw machines as claimed in claim 11 wherein said shoe means and said leg means are rigidly connected to one another.

13. A direct coupled way system for tilt frame type movable head band saw machines wherein a cutting band is trained in tension over spaced upstream and downstream band wheels supported by a movable head which is pivotally connected to a movable carriage whereby the movable head is free to move in more than one plane relative to a work piece held in position in the path of the cutting band by an arrangement of support members, the direct coupled way system comprising:

shoe means slidably connected to the work piece support member lying between the work piece and the downstream band wheel;

leg means rigidly connected to said movable head and slidably connected to said shoe means, said leg means being permitted to move with said movable head while maintaining slidable engagement with said shoe means such that, irrespective of the position and orientation of said movable head, said movable head and the work piece support member lying between the work piece and the downstream band wheel are directly coupled through said shoe means and said leg means.

14. A direct coupled way system for tilt frame type movable head band saw machines as claimed in claim 13 wherein said shoe means comprises a cylindrical section having front and rear faces surmounting a body portion, said body portion having an arcuate face and a cord face, said cord face having a projection extending outward therefrom; and said leg means comprises a substantially rectangular body portion surmounted by a slot having an arcuate race bounded by first and second walls, said slot having a width substantially equal to the distance between the front and rear fces of said shoe means, said arcuate race having a radius of curvature substantially equal to that of said arcuate face of said shoe means such that said shoe means may be slidably received within said slot of said leg means.

15. A direct coupled way system for tilt frame type movable head band saw machines as claimed in claim 14 wherein said projection extending outward from said cord face of said shoe means has a width slightly less than the width of a passageway machined in the work table to permit passage of the cutting band during cutting operations.

16. A direct coupled way system for tilt frame type movable head band saw machines as claimed in claim 14 wherein said cord face slidably engages the work piece support member lying between the work piece and the downstream support member such that counteracting forces tending to maintain said downstream band wheel in its spaced position relative to the support member lying between the work piece and the downstream band wheel are transmitted through said cord face.

17. A direct coupled way system for tilt frame type movable head band saw machines as claimed in claim 12 wherein said first and second walls of said leg means engage said front and rear faces surrmounting said body portion of said shoe means such that said shoe means is moved with said leg means as said movable head is moved into and out of the work area.

* * * * *